March 22, 1927.
S. W. ELSTONE
1,622,190
THREAD CUTTING MECHANISM
Filed March 6, 1925
2 Sheets-Sheet 1
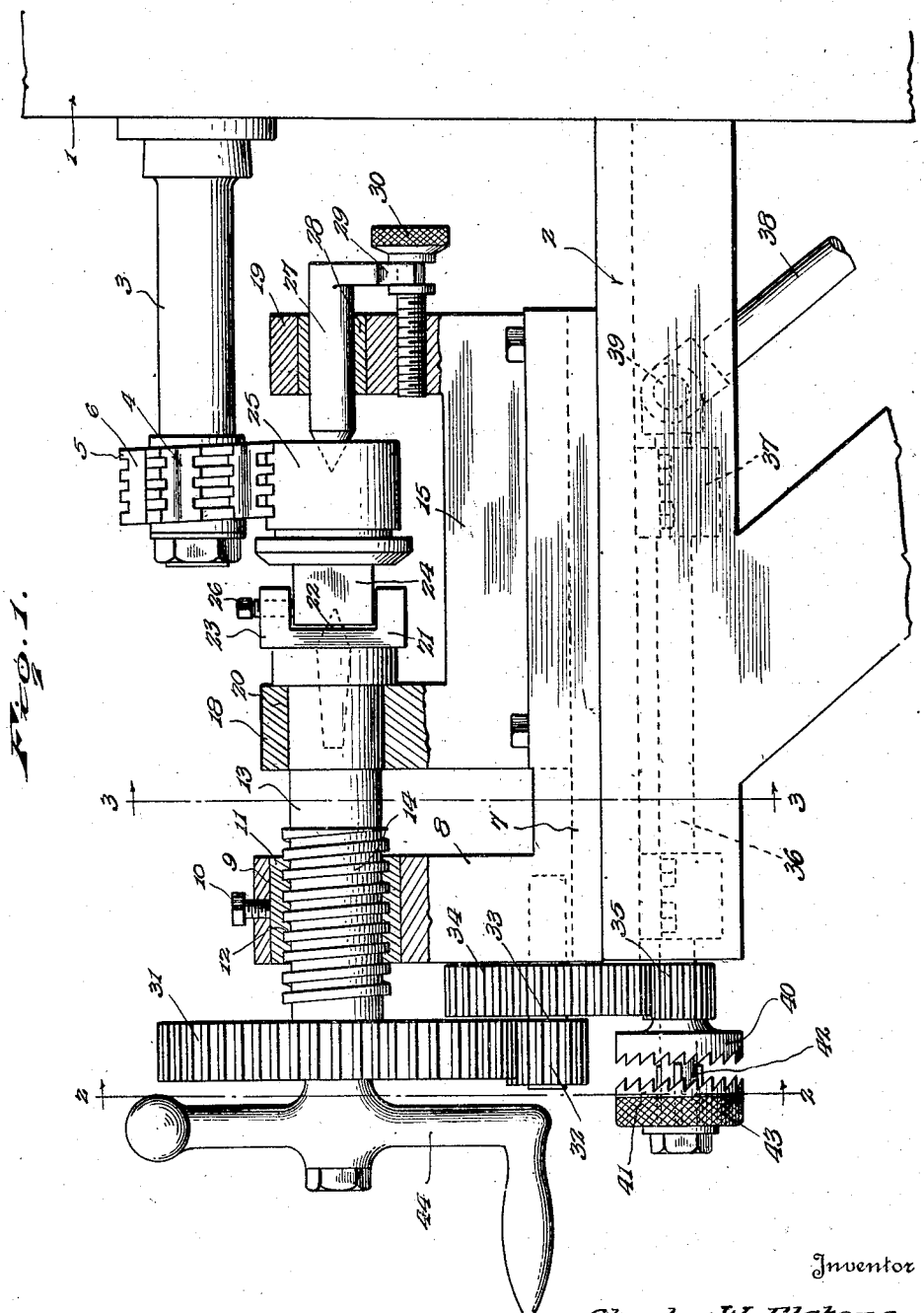
Inventor
Stanley W. Elstone.
By
Lacey & Lacey, Attorneys

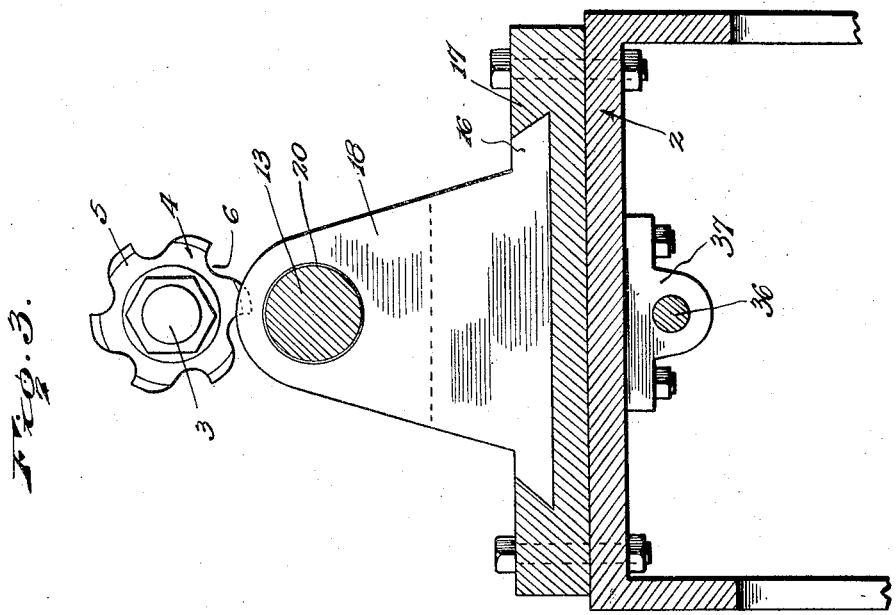
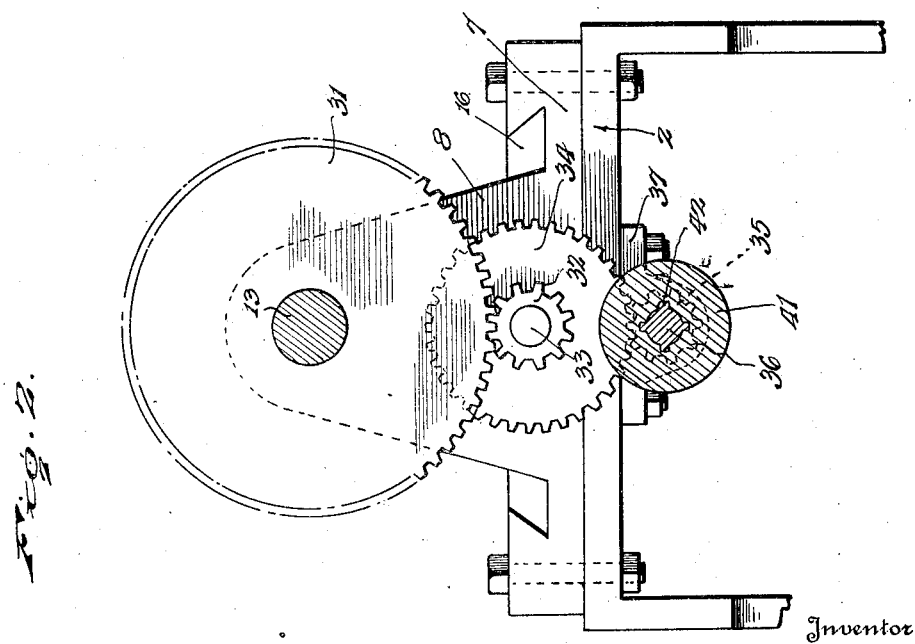

Patented Mar. 22, 1927.

1,622,190

UNITED STATES PATENT OFFICE.

STANLEY W. ELSTONE, OF WALKERVILLE, ONTARIO, CANADA, ASSIGNOR TO HURON MANUFACTURING CO., OF DETROIT, MICHIGAN, A CORPORATION OF MICHIGAN.

THREAD-CUTTING MECHANISM.

Application filed March 6, 1925. Serial No. 13,533.

This invention relates to thread cutting machinery and more particularly to a mechanism which may be readily installed upon an ordinary milling machine and employed in cutting threads in blanks, and while the mechanism is designed primarily for employment in cutting threads in washout and similar plugs for steam boilers, tanks, etc., it may be employed in cutting threads in other types of blanks. Likewise, while the mechanism is designed specifically for the purpose of cutting threads of the square type, it may be employed in cutting other types of threads.

Heretofore considerable difficulty has been experienced in economically threading plugs of the type referred to above, where the threads are required to be of the square type and the threading operation has consumed considerable time and difficulty has been experienced in performing the work accurately and without waste of material. Therefore, it is one of the important objects of the present invention to provide a thread cutting mechanism by the use of which plug blanks may be rapidly and accurately threaded without likelihood of any defects in the work would result in waste of material as well as time and labor.

Heretofore, it has been customary to form threads of the square type by the use of lathes employing cutting bits, but as stated above, the threading operation cannot be carried out rapidly enough to permit of quantity production at a low cost and, therefore, it is another important object of the invention to provide a thread cutting mechanism by the employment of which a required number of threads may be simultaneously cut and the cutting operation performed expeditiously and at the same time more accurately than has heretofore been possible.

Another object of the invention is to provide a thread cutting mechanism in which the work support will be so fed in consonance with the operation of the cutter head as to insure of accurate cutting of the threads, the arrangement being such that the mechanism may be readily and quickly adapted for the cutting of threads of various sizes.

In the accompanying drawings:

Figure 1 is a view partly in front elevation and partly in longitudinal section, illustrating the mechanism embodying the invention installed in connection with a milling machine.

Figure 2 is a vertical front to rear sectional view taken substantially on the line 2—2 of Figure 1, looking in the direction indicated by the arrows.

Figure 3 is a similar view taken on the line 3—3 of Figure 1, looking in the direction indicated by the arrows.

The mechanism embodying the invention is designed to be installed upon an ordinary milling machine of which the frame is indicated in general in the drawings by the numeral 1 and the vertically movable bed by the numeral 2. The numeral 3 indicates the usual cutter head shaft upon which is fixedly mounted a cutter head 4 which, in accordance with the present invention, comprises a substantially cylindrical body having a plurality of series of cutter teeth 5 arranged about its periphery and separated by intervening flutes indicated by the numeral 6, the teeth of the several series being arranged helically about the body of the cutter head and the teeth being of a rectangular contour and of dimensions to cut threads in the blanks of the corresponding contour. In accordance with the invention, the teeth of each series are of a number corresponding to the number of threads to be cut in the blanks and the purpose of this proportioning of the number of teeth will presently be made clear.

Fixed upon the bed 2 is a bed plate 7 provided at one end with an upstanding head 8 having an opening 9 therein in which is removably secured, as for example, by a set screw 10, a bushing 11, the bore of which is formed with threads 12. The numeral 13 indicates a chuck spindle which for a portion of its length is formed with threads 14 to fit the threads 12, it being understood at this point that rotation of the spindle 13 will result in its being fed longitudinally through the said bushing 11. The numeral 15 indicates a block which is slidably disposed upon the bed plate 7 and guided by the engagement of its base flanges 16 with spaced guides 17 upon the upper side of the bed plate 7. The block 15 supports at one end a head stock indicated by the numeral 18 and at its other end a tail stock indicated by the numeral 19. The chuck carrying end of the spindle 13 is rotatably journaled in an opening 20 in the head stock 18 and the chuck is indicated by the numeral 21 and is provided with a center 22 and with spaced lugs 23 between which a portion of the work to be acted upon, as for example, the squared stud 24 of a washout plug blank 25, is disposed and clamped by means of a set screw 26 threaded through one of said lugs. The tail center is indicated by the numeral 27 and engages the other end of the blank 25 and is slidably fitted through a bushing 28 in the tail stock 19 and has a yoke 29 straddling the shank of an adjusting screw 30 adjustably threaded into the said tail stock. At this point, it will be understood that when the spindle 13 is rotated and fed longitudinally, it will carry with it the block 15 and the work supported between the chuck 21 and the tail center 27, the work being, at the same time, rotated with the spindle.

In order that rotary motion may be imparted to the spindle 13 at a low rate of speed, a gear 31 is fixed upon the end of the spindle and meshes with a pinion 32 upon a stub shaft 33 carried by the head stock 18, the said pinion rotating with a gear 34 likewise mounted upon the stub shaft and the said gear 34, in turn, meshing with a pinion 35 which is freely rotatably mounted upon a shaft 36, in turn mounted in suitable bearings 37 beneath the bed 2. Rotary motion is imparted to the shaft 36 through the medium of a shaft 38 which has universal connection, as at 39, therewith, the said shaft 38 being, in turn, driven from the drive shaft (not shown) of the milling machine. A clutch member 40 is fixed for rotation with the pinion 35, and a companion clutch member 41 is slidably mounted upon the outer end of the shaft 36 and held for rotation therewith by splines 42, the clutch member 41 being preferably provided with a knurled surface 43 whereby it may be readily manually shifted into and out of engagement with the clutch member 40, it being understood that while the shaft 36 rotates continuously, the pinion 35 and train of gearing driven therefrom will be idle until the clutch member 41 is shifted into engagement with the clutch member 40, whereupon the gearing will be set in motion and rotary motion will be imparted to the spindle 13.

As previously stated, in milling machines, the bed 2 is vertically movable and at the time of mounting the piece of work or blank 25, the bed will be in lowered position. After the blank has been properly mounted, the bed is elevated by the usual means provided for this purpose so as to bring the blank into position to be acted upon by the cutter head 4 and, at the same time, the clutch member 41 is manually shifted into engagement with the clutch member 40, thereby setting in motion the gearing which transmits rotary motion to the spindle 13. The cutter head 4 is, of course, rotating at this time and as the blank 25 is brought into contact with the cutter head, it will be acted upon by the teeth 5 and threads will be cut therein, the speed of operation of the several parts being such that, in the illustrated embodiment, four threads, will be cut in the blank 25 during one revolution of the spindle 13. When the cutting operation is completed, the clutch member 41 will be withdrawn from engagement with the clutch member 40, the bed 2 lowered, and a crank handle 44 which is associated with the spindle 13, will be manually operated to backwardly rotate the spindle and restore it to its normal or original position.

As previously stated, one of the objects of the invention is to provide a thread cutting mechanism in which the work support will be so fed in consonance with the operation of the cutter head as to insure of accurate cutting of the threads and in which the arrangement is such that the mechanism may be readily and quickly adapted for the cutting of threads of various sizes. This is accomplished by removing the cutter head and substituting one of another size and by loosening the set screw 10 and bodily withdrawing the bushing 11 and the chuck spindle 13 which is carried thereby, and substituting for these parts a bushing and chuck spindle having threads of a pitch and size corresponding to the threads of the cutter head which is to be substituted for the one removed.

Having thus described the invention, what I claim is:

A thread cutting machine comprising a bed plate having an upstanding head having an opening therein, a block slidably mounted upon the bed plate and having upstanding head and tail stocks, a work supporting element carried by the tail stock, a spindle rotatably mounted in the head stock, a chuck carried by the said spindle for supporting the end of the work opposite the end which is engaged by the said supporting element and having a shoulder abutting the head stock, a bushing removably fitted in the opening in the head of the bed plate, means removably securing the bushing in place, the bushing being interiorly threaded and the spindle having a threaded portion fitting therein, a gear fixed upon the spindle, and a drive gear in mesh therewith and free from obstruction to lateral displacement and disengagement of the first mentioned gear therefrom when the securing means for the bushing is rendered inactive.

In testimony whereof I affix my signature.

STANLEY W. ELSTONE.